UNITED STATES PATENT OFFICE 1,998,432

EARTHLIKE MATERIAL AND METHOD OF MAKING SAME

Earl B. Busenburg, Akron, Ohio, assignor to The B. F. Goodrich Company, New York, N. Y., a corporation of New York No Drawing. Application August 17, 1932, Serial No. 629,248

6 Claims. (Cl. 18—52)

This invention relates to the manufacture from waste fibers of a product resembling certain types of earthy materials which are widely used in manufacture and for other purposes.

Many industries normally produce large quantities of by-product fibrous material of which they are unable to dispose profitably and which now represent considerable economic loss, a condition particularly prevalent in the rubber reclaiming industry.

The bulk of rubber articles including tires, hose, footwear, mechanical goods, etc. which are subjected to reclaiming processes contain considerable quantities of cotton fabric, cord, and other fibrous reinforcement which in certain processes is separated from the rubber before the latter is prepared for re-use. The separation of such fibrous material is usually effected either by first removing from the rubber article such portions of fiber-free rubber as may be conveniently separated and then shredding the remaining rubber impregnated fibrous material or by shredding the whole article at once and in either case then subjecting the shredded product to an intensive mechanical separating treatment whereby a substatial portion of the rubber is removed, leaving a shredded fibrous by-product usually containing 5 to 25% by weight of unseparated rubber. Considerable quantities of such rubber-containing reclaimed fibrous by-product have been accumulated by rubber reclaimers and extensive effort has been directed toward developing profitable uses for it.

It is the object of the present invention to provide a method of treating fibrous material, particularly reclaimed rubber-containing fiber, whereby a new product possessing properties rendering it valuable in many applications may be produced.

Broadly, this invention comprises rendering cellulosic fibers friable and altering other properties of the fibers by means of a thermal partial decomposition process and then physically disintegrating the friable heat-treated fibers to produce an earth-like material.

It has been found that if cellulosic fibers are subjected to relatively high temperatures, preferably in the presence of moisture, the cellulose composing the fibers will be decomposed in such manner as to produce an altered fibrous product which may be readily and easily comminuted and which both in appearance and characteristic properties resembles certain types of earthy materials which are now widely used.

The heat treatment of the fibers is conveniently and preferably effected by subjecting the fibrous material to the action of heated gases such as steam, carbon dioxide, nitrogen, or air from which at least part of the oxygen has been removed, such relatively inert gases being used in preference to atmospheric air in order to eliminate any possibility of combustion of the fibers occurring at elevated temperatures employed in the process, although atmospheric air may be used in some cases.

Steam generally has proved to be the most satisfactory gas for use in this invention because it is usually available in processing plants, is cheap, and further because the presence of water vapor is desirable during the heat-treating of the fibers.

Although the time and temperature of the thermal treatment obviously may be widely varied to produce materials of varying properties useful in particular applications, it has been found that earth-like products most satisfactory for the uses hereinafter indicated are produced when the fibers are subjected to the action of the heated gas over a range of times and temperatures varying from about 8 hours at approximately 337° F. (100 lbs. steam gauge pressure) to about 15 hours at approximately 388° F. (200 lbs. gauge pressure).

The resultant friable heat-treated fiber after removal from the header may be broken up or comminuted to a greater or less extent by any convenient grinding means which will serve to disaggregate the material. If necessary and desirable, the disaggregated material may be dried in any convenient manner. Thereafter, where the material is made from waste fiber containing foreign material, the dried comminuted material may be screened to remove such foreign matter and may be passed through a magnetic separator to remove metallic impurities.

When subjected to the above treatment, the color of the material changes from the natural grayish white of the untreated fibers to a darker color ranging from a light brown or tan to a very dark brown. The color change together with the physical disaggregation of the treated fibers produces a material strikingly similar in appearance to rich wood soil, the resemblance varying, depending upon the degree of disaggregation, from a finely divided soil, to a typical somewhat bulky wood soil containing a considerable amount of partially decomposed vegetable matter.

The physical properties of this earth-like product make it exceedingly valuable as a filler for plastic compositions, particularly rubber or asphalt base and bakelite compositions. Superior hard rubber and asphalt base storage battery boxes, hard rubber automobile steering wheels, and similar products have been made from compositions containing the earth-like product of the present invention.

In the course of the heat treatment of the fibers, certain constituents of the associated rubber, or possibly of the fibers themselves, are hydrolyzed, oxidized, or otherwise converted to acidic materials which render the product slightly acid, the acidity usually ranging from 0.001 to 0.01% by weight calculated as $H_2SO_4$. Sulphur in the rubber doubtless undergoes such reaction and other associated materials may be similarly affected.

The resulting slight acidity coupled with the characteristic water-absorbing properties of the earth-like product combine peculiarly to make it valuable as a mulch, useful as a substitute for peat moss and like materials which are mixed with soil and placed around plants to retain moisture, maintain the soil in a porous condition, and promote growth of the plants. Florists and gardeners have found the product of this invention highly satisfactory for such purposes where a water-absorbent slightly acid bulky material is required.

In a specific example of the present invention, scrap pneumatic automobile tire casings may serve as a source of fiber.

The casings are de-beaded and then passed through a shredder or a grinder such as the "cracker" used in the rubber industry which grinds the rubber and associated rubberized cotton cord and fabric of the tire casing to such a size as will permit the passage of the bulk thereof through a one-fourth inch mesh screen. This grinding treatment effects considerable separation of rubber from the fibers of the cord and fabric.

The coarsely ground scrap is then passed through apparatus capable of further reducing the size of the rubber and fiber agglomerates and of mechanically separating more rubber from the fibers. Apparatus such as a Bauer mill having a pair of burred discs rotating in a closely relationed parallel position, between which discs the scrap is passed, is particularly effective for finely grinding the scrap.

Air separation processes are then employed to separate the loosened fibers from the ground rubber.

Complete separation of the rubber and fiber is practically impossible and the fibrous product prepared in the above described manner will contain an average of about 15% by weight of unseparated rubber.

The rubber-fiber scrap next is packed in bales weighing about 250 pounds each and the bales are placed in an autoclave type heater and subjected to the action of live steam at 200 pounds gauge pressure for nine hours. Thereafter, the bales are broken and the resultant brown friable product is broken up in any of the usual types of apparatus, passed over a series of screens and through a magnetic separator to eliminate undesirable foreign material, after which treatment the product is ready for use as hereinabove indicated.

While the invention has been described somewhat in detail and with reference to certain preferred procedures and uses, it is not intended to limit the invention thereby or otherwise except as may be required by the prior art and as indicated in the appended claims.

I claim:

1. The method which comprises shredding scrap rubberized fibrous material, removing the major portion of the rubber from the shredded material, partially decomposing the remaining shredded essentially fibrous material by treatment for at least eight hours with steam at superatmospheric pressure, and physically disintegrating the treated material to produce a relatively free flowing earth-like product.

2. The method which comprises shredding scrap rubberized fibrous material, separating the major portion of the rubber to leave associated with the shredded fibers a quantity of rubber insufficient to bind the fibers together after subsequent thermal and mechanical disintegration, treating the shredded fibers and associated rubber with an inert gas heated to such temperature and for such time as to effect substantially the same change in the said fibers and rubber as is effected when the said fibers and rubber are heated to a temperature not less than 330° F. for a period of at least eight hours, and physically disintegrating the treated fibers to produce a relatively free flowing non-plastic earth-like product.

3. The method which comprises shredding scrap rubberized fibrous material, separating the major portion of the rubber to leave associated with the shredded fibers a quantity of rubber insufficient to bind the fibers together to any substantial extent and not in excess of 25% by weight, treating the shredded fibers and associated rubber with an inert gas heated to a temperature not less than 330° F. for a period of at least eight hours, and physically disintegrating the treated fibers to produce a relatively free flowing earth-like product.

4. The method which comprises shredding scrap rubberized fibrous material, separating the major portion of the rubber to leave associated with the shredded fibers a quantity of rubber insufficient to bind the fibers together to any substantial extent and not in excess of 25% by weight, treating the shredded fibers and associated rubber with steam at such pressure and for such time as to effect substantially the same change in the said fibers and rubber as is effected when the said fibers and rubber are treated with steam at a pressure of not less than 100 pounds per square inch for a period of at least eight hours, and physically disintegrating the treated fibers to produce a relatively free flowing earth-like product.

5. A product substantially the same as that produced by the method of claim 2.

6. A product substantially the same as that produced by the method of claim 4.

EARL B. BUSENBURG.